Jan. 3, 1939.   C. G. SEYFERTH   2,142,216
LANDING GEAR
Filed May 13, 1936   4 Sheets-Sheet 1
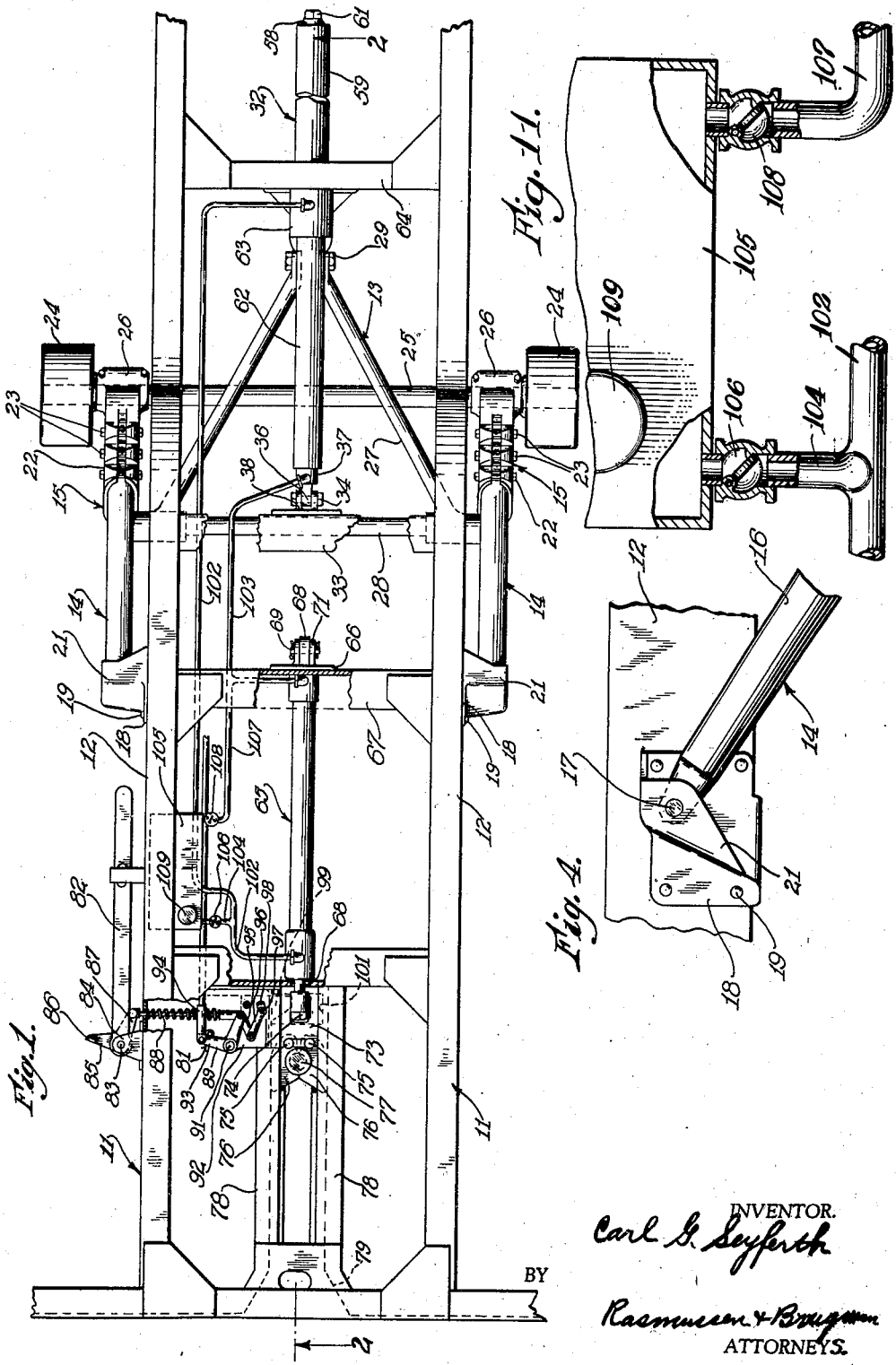
INVENTOR.
Carl G. Seyferth
BY
Rasmussen & Brugman
ATTORNEYS.

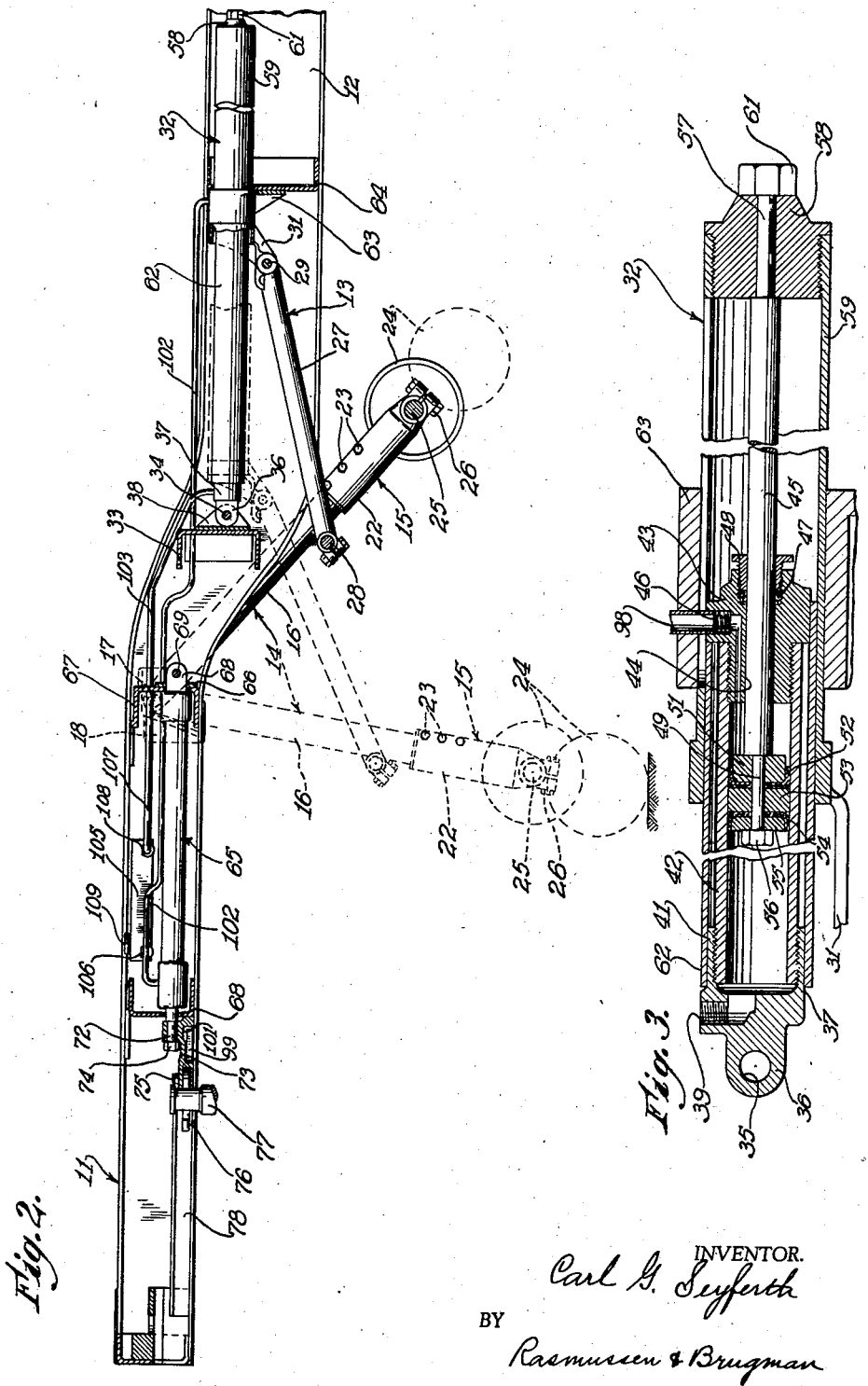

Jan. 3, 1939.  C. G. SEYFERTH  2,142,216
LANDING GEAR
Filed May 13, 1936    4 Sheets-Sheet 3

INVENTOR.
Carl G. Seyferth
BY
Rasmussen & Brugman
ATTORNEYS.

Jan. 3, 1939.                C. G. SEYFERTH                2,142,216
                               LANDING GEAR
                          Filed May 13, 1936        4 Sheets-Sheet 4
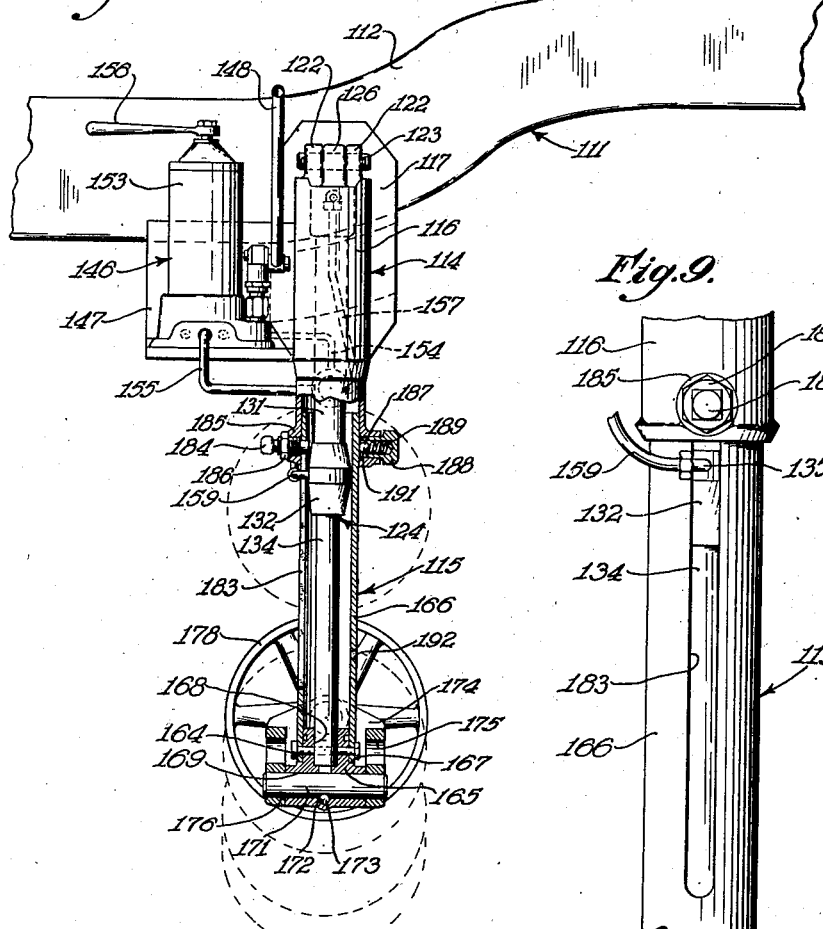
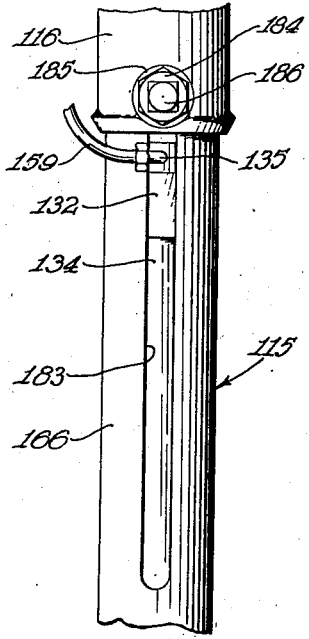
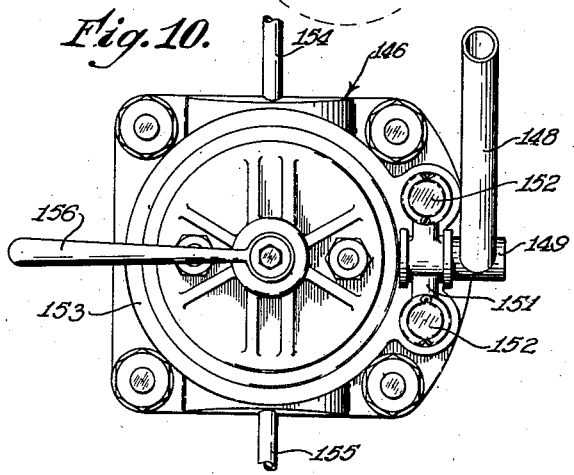
INVENTOR.
Carl G. Seyferth
BY
Rasmussen & Brugman
ATTORNEYS.

Patented Jan. 3, 1939

2,142,216

UNITED STATES PATENT OFFICE 2,142,216

LANDING GEAR

Carl G. Seyferth, Muskegon, Mich.

Application May 13, 1936, Serial No. 79,540

4 Claims. (Cl. 280—33.1)

This invention relates in general to landing gears, and has more particular reference to retractible landing gears for semi-trailers and the like.

A principal object of the invention is the provision of a novel hydraulic landing gear employing double acting rams.

An important object of the invention is the provision of an hydraulic landing gear for a trailer vehicle which is automatically operated during coupling and uncoupling of the trailer and its tractor.

Another important object of the invention is the provision in such an hydraulic landing gear of a novel adjustable wheel truck or assemblage.

A further important object of the invention is the provision of automatically operable means for locking the landing gear in retracted position.

Another important object of the invention is the provision in such an hydraulic landing gear of a horizontal brace which also functions as a protective housing for certain of the fluid conduits.

Numerous other objects and advantages of the invention will be apparent as it is better understood from the following description, which, when taken in connection with the accompanying drawings, discloses a preferred embodiment thereof.

In the drawings,

Figure 1 is a top plan view of the chassis of a part of a trailer provided with a landing gear embodying the features of the invention;

Fig. 2 is a longitudinal section taken substantially on line 2—2 in Fig. 1;

Fig. 3 is a vertical sectional view of one of the hydraulic rams employed;

Fig. 4 is a detail elevational view of a part of the landing gear, illustrating the hinged arrangement;

Fig. 8 is a side elevational view of the mechanism of Fig. 5 with parts shown in section;

Fig. 9 is a detail rear elevational view of a part of the landing gear of Fig. 5;

Fig. 10 is an enlarged plan view of the pump and control mechanism therefor of Fig. 5, and Fig. 11 is an enlarged detail plan view of a part of the hydraulic system, showing the check valves in horizontal section.

Figure 5:
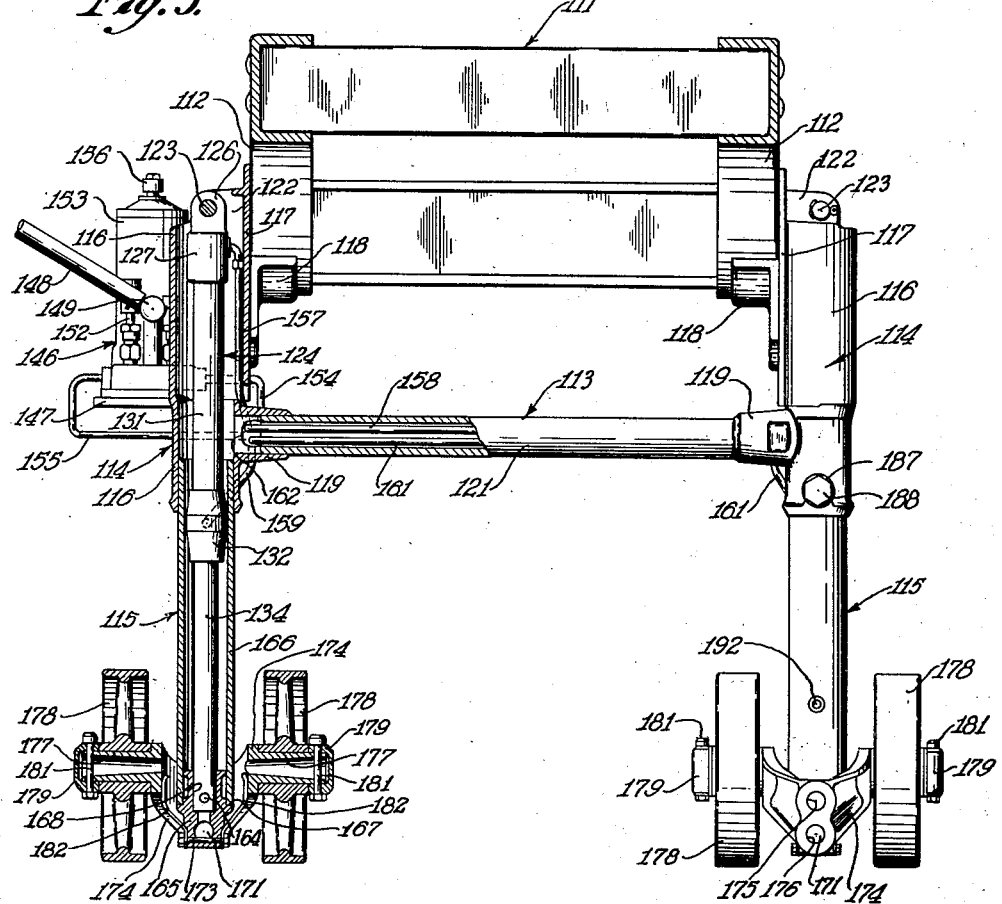
Fig. 5 is a front elevational view, partly in section, of a part of a trailer provided with a modified form of hydraulic landing gear which is adapted to be manually controlled and operated.

Referring more particularly to the drawings, reference numeral 11 indicates in general a trailer or a semi-trailer vehicle having side frame members 12, and being provided adjacent its forward end with a retractible landing gear embodying the features of the instant invention and designated generally by reference numeral 13.

The landing gear 13 is of the swinging type, and comprises a pair of hinged supporting members indicated generally at 14, and a movable wheel carrying structure associated with each supporting member 14 and indicated generally by reference numeral 15. In the retracted position of the landing gear 13, the wheel carrying structures 15 are moved upwardly and rearwardly to their full line position of Fig. 2, while in extended position, as shown in dotted lines, the landing gear 13 is adapted to support the forward end of the trailer.

Each supporting member 14 comprises a substantially cylindrical shaft 16 whch is adapted to be hingedly connected at 17 to a supporting bracket 18 (Fig. 4). The supporting brackets 18 are fastened to the side frame members 12 by means of rivets or the like 19. Each bracket 18 has formed integrally therewith an overhanging member or stop 21 to limit forward movement of the supporting member 14.

The wheel carrying structures 15 are slidably mounted upon the cylindrical shafts 16 and comprise casings 22, bolts 23 and wheels 24. The casing 22 is adapted to be moved upon the shaft 16 so as to provide a means for raising or lowering the wheels 24 relative to the shaft to insure proper adjustment thereof. The wheels 24 are rotatably mounted upon a cross shaft 25, the shaft 25 being held in place in the casings 22 by means of the usual clamping members 26.

A forked or radius rod 27 is pivotally mounted at its spaced ends upon a cross shaft 28, which is in turn connected at its ends to the shafts 16, and the converging end of the rod 27 is pivotally mounted at 29 upon a depending arm 31 which is integral with a double acting ram indicated generally by the reference numeral 32, the operation of which will be more fully described hereafter. The stationary end of the double acting ram 32 is secured to a cross frame member 33 by means of a pin 34 engaging a suitable aperture 35 (Fig. 3) in an extension 36 of a cap 37 of the ram structure 32, the extension 36 being disposed between parallel brackets 38 secured to the frame member 33.

Referring more particularly to Fig. 3, the cap 37 of the ram structure 32 is provided with a suitable port 39 which may be threaded adjacent its outer end with a standard pipe thread tap, and has an internally threaded skirt portion 41 adapted to be screwed onto the forward end of a tube or hollow cylinder 42.

A plug member 43 is screwed into the other end of the tube 42, and is provided with an axial bore 44 through which a shaft or piston 45 extends, and a right angled passage-way or port 46 which is threaded adjacent its outer end, similarly to the port 39, and communicates with the interior of the cylinder 42 at its inner end. The rearward end of the bore 44 is enlarged to provide space for suitable packing 47 which is held in place by means of a nut or thimble 48 screwed into the enlarged part of the bore 44.

The forward end of the piston rod 45 is reduced, as indicated at 49, and this reduced portion is threaded at its extreme end. A compound piston is mounted on the reduced portion 49, comprising a washer 51 abutting against the shoulder at the bottom of the reduced portion, a leather cup 52 inverted over the washer 51, a ring 53 abutting against the leather cup 52 and constituting the main part of the piston, a second leather cup 54 similar to the cup 52 but reversed with respect thereto, and a washer 55 disposed within the cup 54. These several members that are mounted on the reduced portion 49 of the piston rod 45 are rigidly secured thereto by means of a nut 56.

The rear end of the rod 45 is reduced, as indicated at 57, and this reduced portion is threaded at its extreme end. A plug 58 is mounted on the reduced portion 57 and has its outer surface threaded so as to fit the threads on the inner surface of a casing or tube 59. The plug 58 is held in place upon the reduced portion 57 by means of a nut 61. The casing 59 is adapted to engage and slide upon a casing 62 which is fitted over the cap 37 and the plug 43 so that there is a continuous surface upon which the casing 59 may slide. The bracket 31 is also an integral part of the casing 59 so that any movement that may be imparted to the casing is in turn transmitted to the bracket 31 and the rods 27. A bracket 53 is fastened in any suitable manner to a cross frame member 64, and slidably engages the casing 59 to hold the hydraulic ram in position and permit free longitudinal movement of the casing.

A second double acting hydraulic ram, generally indicated by the reference numeral 65 is fastened forward of the hydraulic ram 32, the construction of the hydraulic ram 65 being similar to that of the ram 32. One end of the hydraulic ram 65 is fastened to a bracket 66 which is secured to a cross frame member 67. A rod 68, similar to the rod 45, is held in position by means of a pin 69, said pin passing through the rod 68 and a pair of laterally extending ears 71 formed integrally with the bracket 66. The other end of the rod 68 is reduced, as indicated at 72, and this reduced portion is threaded at its forward end.

A sliding plate 73 is fastened to the reduced portion 72 by means of a nut 74. Pivotally mounted upon the sliding plate 73 at 75 are a pair of movable jaw members 76. The jaw members 76 are adapted to engage a king pin 77, which constitutes part of the tractor, in the usual and well-known manner. The jaw members are held in closed or king pin engaging position by a pair of longitudinally extending guides 78, which flare outwardly at their forward end at 79 (Fig. 1).

A manually operable toggle mechanism, generally indicated by reference numeral 81, is adapted to lock the jaw members 76 and king pin 77 against longitudinal movement in their rearward position of Fig. 1. The toggle mechanism 81 comprises a lever 82 which is pivotally mounted at 83 upon a bracket member 84 secured to the trailer frame. A bell crank member 85 is also pivotally mounted at 83, and is provided on one arm thereof with a stop or lug 86 for engagement with the lever 82. The other arm 87 of the bell crank 85 has one end of a rod 88 pivotally mounted upon it, which rod is in turn pivotally mounted upon one arm of a bell crank 89. The bell crank 89 is pivotally mounted at 91 upon a stationary guide plate 92. The other arm 93 of the bell crank 89 is fastened to an emergency brake rod 94 which in turn is fastened to the brake drums of the wheels of the trailer 11 (not shown).

One end of a link 95 is also pivotally secured to the inner end of the rod 88, and its other end is pivotally connected to the outer end of a bell crank lever 96. The lever 96 has a pin and slot connection at 97 intermediate its ends with the stationary guide plate 92, and terminates at its inner end in a cam projection 98. The inner end of the rod 88 is also secured to a sliding locking bolt 99 which is adapted to engage within a suitable recess 101 in the sliding jaw carrying plate 73 (Fig. 2). The toggle mechanism 81 is similar to that disclosed in U. S. Letters Patent No. 2,028,400, issued January 21, 1936, to C. H. Land et al. and its operation will be described hereinafter.

The hydraulic ram 65 is adapted to actuate the hydraulic ram 32. A tube 102 connects the hydraulic ram 65 at its forward end to the hydraulic ram 32 at the port opening 46. Another tube 103 connects the rearward end of the hydraulic ram 65 with the hydraulic ram 32 at the port opening 39. The tube 102 has an auxiliary tube 104 which is connected to a reserve tank 105. A check valve 106 is placed in the auxiliary line 104 to allow the flow of fluid to be in one direction only. A second auxiliary tube 107 is inserted in the line 103, and is provided with a check valve 108 which permits the flow of fluid in one direction only. A vent 109 is inserted in the reserve tank 105 to allow the tank to be open to the atmosphere. The purpose of the tank 105 is to keep the lines 102 and 103 and the hydraulic rams 32 and 65 completely filled with fluid at all times.

The operation of the above-described device of Figs. 1 to 4 is as follows: With the tractor and trailer vehicles in coupled position, as shown in Figs. 1 and 2, the operator merely swings the lever 82 outwardly from its retracted position of Fig. 1. Such movement of the lever 82 swings the bell crank 85 in a counterclockwise direction (Fig. 1) to set the toggle mechanism 81 in the manner more specifically described in my copending application. Briefly, this results in an outward movement of the rod 88 against the pressure of the spring surrounding the same to set the parking brake through the agency of the lever 89 and rod 94, straighten the toggle linkage 95, 96, and pull the bolt 99 outwardly from the recess 101 in the sliding guide plate 73. The toggle mechanism will remain in this set position, and the lever 82 may be returned to its position of Fig. 1.

The operator, having thus set the toggle mechanism and released the sliding plate 73 from the locking bolt 99, has merely to drive the tractor away from the trailer, the parking brakes maintaining the trailer stationary. As the tractor is driven forward, the king pin 77 forming a part of the usual fifth wheel mechanism mounted thereon will pull the jaws 76 and plate 73 forward relative to the trailer. The guides 78 will maintain the jaw members 76 in king pin engaging position until the jaws reach the flared portion 79 of the guides. At this point the king pin 77 will spread the jaw members 76 apart and disengage itself therefrom to complete the disconnection of the tractor from the trailer.

In this forward movement of the sliding plate 73, the piston rod 68 of the hydraulic ram 65 is pulled forwardly to force the liquid in the forward part of the ram through the conduit 102 and port 46 into the rear part of the hydraulic ram 32. This will force the piston of the ram 32 and the piston rod 45 forward, during which movement, the liquid in the forward part of the ram 32 will be forced out through the port 32 and conduit 103 into the rear end of the ram 65. Since the piston in the ram 65 is moving forward at this time, a low pressure will be created in the rear portion of the ram to aid in this movement of the liquid from the ram 32 to the ram 65. This low pressure in the rearward portion of the ram 65 will also insure sufficient liquid being carried therein to fill the ram when the piston reaches its forward position by sucking in additional liquid through the check valve 108 and conduit 107 from the reserve tank 105, if there be a deficiency of liquid in the system due to leakage, or the like. It will be understood that the capacity of the ram 65 when the piston rod 68 is in its rearward position of Figs. 1 and 2 is equal to the capacity of the ram 32 when the piston rod 45 is at the end of its forward stroke, and the capacities of the two rams 65 and 32 are also equal when the piston rod 68 is in its forward position and the piston rod 45 is in its rearward position of Figs. 1 and 2.

The forward movement of the piston and the piston rod 45 of the rear hydraulic ram 32 pulls the sleeve 59 and the arm 31 forward to lower the landing gear 13 through the agency of the rod 27 into its dotted line position of Fig. 2. Such movement of the landing gear to its lowered position will necessarily take place before the king pin 77 has disengaged itself from the jaw members 76 and while the trailer 11 is still supported by the tractor, since the distance of travel of the king pin with the jaws 76 which is enforced by the guides 78 is equal to the maximum longitudinal movement of the piston rod 68 of the forward hydraulic ram 65.

When it is desired to recouple the tractor with the trailer, all that is necessary is to back the former rearwardly into engagement with the latter. In this movement, the king pin 77 will engage the jaw members 76, since the latter will remain in their forward open position, and will push them, together with the sliding plate 73, rearwardly relatively to the trailer. As the sliding plate 73 reaches its rearward position of Figs. 1 and 2, it will engage the cam end portion 98 of the toggle lever 96 to trip the toggle mechanism and allow the spring surrounding the rod 88 to return the same to its position of Fig. 1. In this return movement, the locking bolt 99 is moved into the recess 101 of the sliding plate 73 to lock the latter and the jaw member 76 in their final position of Fig. 1. The bell crank 89 is also swung back to its position of Fig. 1 to move the rod 94 forwardly to release the parking brakes.

The rearward movement of the sliding plate 73 relative to the trailer 11 will push the piston rod 68 and piston of the forward hydraulic ram 65 rearwardly. This will force the liquid within the ram 65 through the conduit 103 and port 39 into the forward portion of the rear hydraulic ram 32 to move the piston and piston rod 45 of the latter rearwardly and force the liquid therein through the conduit 102 into the forward end of the hydraulic ram 65. If there be a deficiency of liquid in this portion of the system, it will be made up by liquid from the reserve tank 105 being drawn through the check valve 106 and auxiliary conduit 104, due to the low pressure created in the forward portion of the ram 65. Such rearward movement of the piston rod 45 of the hydraulic ram 32 will slide the sleeve 59 and rod 31 rearwardly to raise the landing gear 13 to its full line position of Fig. 2.

It will be readily apparent that in the forward movement of the piston in the hydraulic ram 65, as the liquid is forced therefrom through the conduit 102, the check valve 106 will prevent any flow of this liquid from the conduit 102 into the reserve tank 105. Similarly, in the forward movement of the piston in the hydraulic ram 32 to force the liquid through the conduit 103, the check valve 108 will prevent any of this liquid from being forced into the reserve tank 105. However, if at any time there is a deficiency of liquid in the system, the low pressure created in that portion of the particular hydraulic ram 32 or 65 from which its associated piston is being moved, will cause additional liquid to flow from the reserve tank 105 into that portion of the particular hydraulic ram, through either the valve 106 or the valve 108, depending upon which of the conduits 102 or 103 is connected to the low pressure side of the particular hydraulic ram. This automatic addition of sufficient liquid from the reserve tank 105 to the affected part of the hydraulic system is aided by the mounting of the tank 105 at the highest point of the system (as seen in Fig. 2), which provides an additional pressure head at this point.

It will also be clearly apparent that any air which may become entrained within any portion of the hydraulic system will be collected in the conduit 104 and/or the conduit 107, which conduits are alternately under a low pressure during alternate raising and lowering operations of the instant landing gear. So long as there is a full supply of liquid in the hydraulic system, there will normally be no air entrained therein, but any air which may be in the system will be collected in the conduits 104 and 107, as above described. Consequently, when either the check valve 106 or the check valve 108 is opened, due to the flow of liquid from the reserve tank 105 into the system in the automatic addition of liquid to compensate for loss by leakage, the air entrained in the system which has collected in the associated conduits 104, 107 will be allowed to escape upwardly therefrom into the reserve tank 105. This escape action of the air entrained within the hydraulic system is facilitated by the provision of the vent 109 on the reserve tank 105, which is open to the atmosphere.

Referring to Figs. 5 to 10, a modified form of hydraulic landing gear is shown which is of the vertical type, as distinguished from a swinging type of landing gear, as above described, and which is adapted to be manually controlled and operated. Reference numeral 111 indicates in general, a trailer or semi-trailer vehicle having side frame members 112, and being provided adjacent its forward end with a vertical type retractible landing gear designated generally by reference numeral 113.

The landing gear 113 comprises a pair of fixed supporting members indicated generally at 114 and a movable wheel carrying structure associated with each supporting member 114 and designated generally by reference numeral 115. In the retracted position of the landing gear 113, the wheel carrying structures 115 are telescoped into their respective supporting members 114, the wheels assuming their upper broken line position of Fig. 8, while in extended position, as shown in full lines in Figs. 5 and 8, the landing gear is adapted to support the forward end of the trailer.

Each supporting member 114 comprises a hollow, substantially cylindrical housing 116 which is formed integral with a vertically disposed backing plate 117 and a supporting bracket 118 on its inner side (Figs. 5 and 8). The supporting surfaces of the brackets 118 are curved or otherwise shaped to fit the lower surface of the side frames 112 of the trailer 111, and, together with the plates 117, are rigidly secured to said trailer frame members 112 in any suitable manner.

Adjacent their lower ends, each of the supporting members 114 is provided with a hollow, inwardly directed, horizontally disposed extension 119 formed integral with the housing 116. Extending into and rigidly secured at each end in any desired manner to these extensions 119 is a horizontally disposed tubular brace 121 for imparting rigidity and stability to the landing gear structure.

Adjacent their upper ends, each of the supporting members 114 is provided with a pair of spaced, parallel brackets 122 formed integral with the backing plate 117 and extending outwardly therefrom over the open upper end of the housing 116. A horizontally disposed pin 123 is mounted in each pair of brackets 122 in alinement with the axis of the related housing 116.

The upper end of a double acting hydraulic ram structure, indicated generally by reference numeral 124, is secured to each of the supporting members 114 by means of the pin 123 engaging a suitable aperture 125 (Figs. 6 and 7) in an extension 126 of a cap 127 of the ram structure 124, the extension 126 being disposed between the parallel brackets 122.

Figure 6:
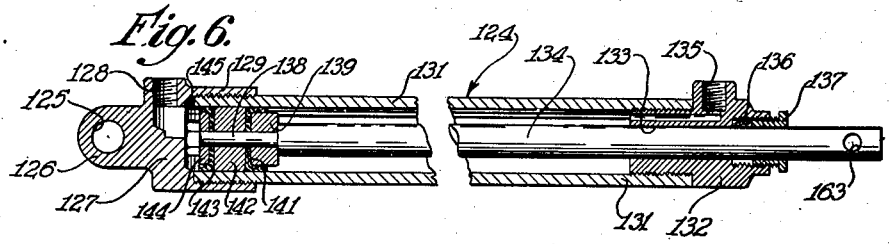
Fig. 6 is a longitudinal section through one of the hydraulic rams of Fig. 5.
Figure 7:
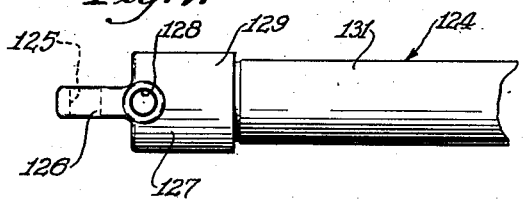
Fig. 7 is a detail plan view of the device of Fig. 6.

Referring more particularly to Fig. 6, the cap 127 of the ram structure 124 is provided with a suitable port 128 which may be threaded adjacent its outer end with a standard pipe thread tap, and has an internally threaded skirt portion 129 adapted to be screwed onto the upper end of a tube or hollow cylinder 131.

A plug member 132 is screwed into the lower end of the tube 131, and is provided with an axial bore 133 through which a shaft or piston rod 134 extends, and a right angled passageway or port 135 which is threaded adjacent its outer end similarly to the port 128 and communicates with the interior of the cylinder 131 at its inner end. The lower end of the bore 133 is enlarged to provide space for suitable packing 136 which is held in place by means of a nut 137 screwed into the enlarged part of the bore 133.

The upper end of the piston rod 134 is reduced, as indicated at 138, and this reduced portion is threaded at its extreme end. A compound piston is mounted on the reduced portion 138, comprising a washer 139 abutting against the shoulder at the bottom of the reduced portion, a leather cup 141 inverted over the washer 139, a ring 142 on top of the leather cup 141 constituting the main part of the piston, a second leather cup 143 similar to cup 141 but inverted with respect thereto, and a washer 144 disposed within the cup 143. These several members that are mounted on the reduced portion 138 of the piston rod 134 are rigidly secured thereto by means of a nut 145.

The above described hydraulic ram structure 124 is operable by means of a pump unit 146 of well-known construction (Figs. 5 and 8) which includes a pump and fluid reservoir and is rigidly mounted on the trailer frame 111 in any suitable manner, as by means of a bracket 147, which may be secured thereto or formed integral with one of the supporting members 114. The pump unit 146 comprises an operating handle or lever 148 which is preferably removably secured to a shaft 149 (Fig. 10) by being threaded into a suitable tapped aperture therein. Rigidly secured to the shaft 149 is a rocker arm 151, each of the ends of which is pivotally secured to a piston rod 152 of a pump of usual construction.

By oscillating the handle 148, the piston rods 152 will be alternately operated to force fluid from a reservoir 153, constituting part of the pump unit 146, through one or the other of a pair of fluid conduits 154, 155. A valve handle 156 in the form of a removable socket wrench constitutes a manual control for selectively determining the direction of flow of the liquid, that is, for controlling the operation of the pump to force liquid from the pump unit through the conduit 154 or through the conduit 155.

The conduit 154 is connected in any suitable manner to two conduits 157 and 158 which are connected at their other ends to the upper ports 128 of the two hydraulic ram structures 124, respectively. The conduit 155 is similarly connected to two conduits 159 and 161 which in turn are connected at their other ends to the lower ports 135 of the two hydraulic ram structures 124, respectively. The two conduits 158 and 161 leading to the ram structure 124 on the far side of the vehicle from the pump and reservoir unit 146 (Fig. 5) are housed within the tubular brace 121 for protection, having access thereto through suitable apertures 162 in the rear surface of the tubular extensions 119.

The lower end of each piston rod 134 of the hydraulic ram structures 124 is provided with a horizontal aperture 163 (Fig. 6) through which a retaining bolt 164 (Figs. 5 and 8) is inserted. The bolt 164 also extends through suitable apertures in the side walls of a thrust bearing member 165 and a tubular housing 166. The housing 166 comprises a part of the wheel carrying structure 115, and is of such external diameter as to fit slidingly into the cylindrical housing 116 of the supporting member 114.

The upper part of the thrust bearing member 165 is substantially cylindrical in shape, so as to fit into the lower end of the tubular housing 166, and terminates in a horizontal shoulder 167 upon which the bottom end of the housing 166 rests. The upper part of the thrust bearing member 165 is also provided with a vertical, centrally located, cylindrical recess or bore 168 into which the lower end of the piston rod 124 extends. The rod 134 abuts against the bottom of the recess 168 so that very little strain is thrown on the retaining bolt 164.

The lower part of the thrust bearing member 165 is provided with a horizontally disposed bore 169 (Fig. 8) through which a removable bearing pin 171 extends. A semi-cylindrical recess 172 is provided through the bearing member 165 at the bottom of and crosswise to the bore 169, and a complementary groove is provided in the bearing pin 171 which, together with the recess 172, comprises a recess through which a retaining bolt 173 extends for preventing displacement of the bearing pin 171.

A circular yoke member or wheel truck 174 is provided with a pair of vertically spaced, horizontally disposed apertures 175 and 176 extending through both side portions thereof parallel with the longitudinal axis of the trailer vehicle 111. The thrust bearing member 165 extends downwardly into the wheel truck 174 and the bearing pin 171 is adapted to be seated in either pair of apertures 175 or 176 (Fig. 8).

Formed integral with the circular yoke member or wheel truck 174 on each side thereof (Fig. 5) is one of a pair of trunnions 177. Rotatably mounted on each trunnion 177 is a wheel 178, the axial movements of which are limited by a shoulder on the trunnion and a removable cap 179 which is retained on the end of the trunnion by means of a bolt 181.

With the above described arrangement, the wheels 178 and wheel truck 174 are pivotally mounted for limited movement laterally of the vehicle on the bearing pin 171. In order to resiliently maintain the wheels in their vertical position, a pair of upwardly extending leaf springs 182 are mounted on each side of the thrust bearing member 165, between the latter and the inside surface of the wheel truck 174. These springs 182 are shaped to substantially conform to the inner surface of the wheel truck 174 with their upper ends free and bearing against said wheel truck and their lower ends retained by the bolt 173.

The provision of the upper and lower parallel apertures 175 and 176 and the shape of the wheel truck 174 permits vertical adjustment of the wheels 178 relative to the thrust bearing member 165 and tubular housing 166 to any one of four desired positions. By removing the retaining bolt 173 and the bearing pin 171, and re-inserting the latter in the upper apertures 175 instead of the lower apertures 176, the wheels 178 may be moved downward relative to the rest of the wheel supporting structure from their full line position of Fig. 8 to their first broken line position therebelow. By removing the pin 171 and turning the wheel truck 174 and wheels 178 through an angle of 180 degrees, re-insertion of the pin 171 in the apertures 175 will bring the wheels into their second broken line position, and insertion of the pin 171 in the apertures 176 will bring the wheels into their lowermost broken line position of Fig. 8.

The rear surface of each of the tubular housings 166 (Figs. 8 and 9) is provided with an elongated vertical slot 183 which serves two functions: First, it provides clearance for the conduit 159 (or 161) leading to the lower port 135 in the plug member 132 of the stationary cylinder 131 during vertical movements of the wheel supporting structure 115 relative thereto. Secondly, the slot 183, in conjunction with a bolt 184 which is screwed into a suitable aperture in a boss 185 on the lower part of the stationary housing 116, holds the wheel structure 115 in line and prevents it from rotating about a vertical axis relative to the supporting structure 114. The bolt 184 may be locked in any desired adjusted position by a nut 186.

Diametrically opposed to the boss 185, each of the housings 116 is provided with another boss 187 (Figs. 8 and 5) having a threaded aperture extending therethrough. A bolt 188 is adapted to be screwed into this aperture, and is provided with an axial recess within which is housed a coil spring 189 and a ball 191, the latter being urged against the outer surface of the tubular housing 166 by the spring. Adjustment of the bolt 188 determines the force exerted by the spring 189 against the ball 191.

Adjacent its lower end and diametrically opposed to the slot 183, the tubular housing 166 is provided with a countersunk aperture 192 of such diameter that the ball 191 may enter but not pass through it. The aperture 192 is so positioned that, when the wheel supporting structure 115 is in its uppermost or retracted position, indicated in Fig. 8 by the uppermost broken line position of the wheels 178, the ball 191 will be forced into the aperture 192 by the spring 189 to resiliently lock the wheel supporting structure 115 against accidental displacement from such retracted position. It will be readily understood that this locking mechanism may equally well be applied to the bracket 63 and sleeve 59, or the sleeves 59 and 62 of the swinging type landing gear 13 of Figs. 1 to 4, if it is desired.

In order to operate the above described hydraulic landing gear of Figs. 5 to 10, the removable pump handle 148 is secured to the shaft 149, the valve handle 156 positioned to constrain flow of fluid from the pump into the upper part of the cylinders 131 through the conduit 154, or into the lower part of the cylinders through the conduit 155, and the handle 148 is oscillated a sufficient number of times to positively force the piston 142 and piston rods 134 to the desired position, either downwardly or upwardly.

So long as the valve handle 156, or its valve shaft operated thereby, remains in its set position, the piston rods 134, and consequently the wheel supporting structures 115, will be maintained in set position, since the fluid in the system may not flow backwardly through the pump unit 146. If the valve handle 156 is moved to its neutral position of Fig. 10, however, or to the position opposite to which it was originally set, the reactive forces against the pistons 142 may cause displacement of the wheel supporting structures from their set position. This will only occur, however, when the landing gear is in retracted position, and the locking mechanism 188—192 will then prevent such accidental displacement.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

I claim:

1. In a tractor, trailer vehicle having cooperating fifth wheel mechanisms on said tractor and said trailer including a king pin, a retractible landing gear mounted on said trailer, a double acting hydraulic ram automatically operable by said king pin in the coupling and uncoupling of said fifth wheel mechanisms, a second hydraulic ram operable by said first ram to raise and lower said landing gear, a fluid supply reservoir, and connections between said reservoir and said rams for transmitting movements of said first ram to said second ram, including valve means for insuring a proper fluid supply at all times from said reservoir and for permitting the escape of any air entrained by said fluid.

2. In a system for hydraulically transmitting the relative movement between two members to a third member mounted on one of said members, a first hydraulic ram mounted on one of said first two members for operation by the other of said members in the relative movement therebetween, a second hydraulic ram interconnected between said first ram supporting member and said third member for moving the latter relative thereto, a fluid supply reservoir, and connections between said reservoir and said rams for hydraulically transmitting movements of said first ram to said second ram, including valve means for insuring the proper fluid supply at all times from said reservoir and for permitting the escape of any air entrained by said fluid.

3. A landing gear for trailers, comprising a wheel supporting structure mounted for movement relative to the trailer and a hydraulic operating system for said wheel supporting structure, comprising a first ram mechanism, a second ram mechanism operatively associated with said wheel supporting structure for moving the latter between retracted and lowered positions, a fluid supply reservoir for insuring the proper amount of fluid at all times, and connection between said reservoir and said ram mechanisms for hydraulically transmitting movements of said first ram mechanism to said second ram mechanism, including valve means for controlling the supply of fluid from said reservoir and for permitting the automatic escape of air entrained by said fluid from the system.

4. In a system for hydraulically transmitting the relative movement between tractor and trailer vehicles during coupling and uncoupling operations thereof to a landing gear mounted on the trailer, a first hydraulic ram mounted on the trailer for operation by the tractor in such relative movement therebetween, a second hydraulic ram interconnected between said trailer and said landing gear for moving the latter relative thereto, a fluid supply reservoir, and connections between said reservoir and said rams for hydraulically transmitting movements of said first ram to said second ram, including valve means for insuring the proper fluid supply at all times from said reservoir and for permitting the escape of any air entrained by said fluid.

CARL G. SEYFERTH.